United States Patent
Hertreiter et al.

(10) Patent No.: US 9,206,877 B2
(45) Date of Patent: Dec. 8, 2015

(54) VIBRATION DAMPING RECEPTACLE DEVICE

(75) Inventors: Martin Hertreiter, Loiching (DE); Frank Schlopakowski, Landshut (DE); Josef Lutz, Landshut (DE)

(73) Assignee: ebm-papst Landshut GmbH, Landshut (DE)

( * ) Notice: Subject to any disclaimer, the term of this patent is extended or adjusted under 35 U.S.C. 154(b) by 92 days.

(21) Appl. No.: 14/001,700

(22) PCT Filed: Feb. 15, 2012

(86) PCT No.: PCT/EP2012/052604
§ 371 (c)(1),
(2), (4) Date: Aug. 27, 2013

(87) PCT Pub. No.: WO2012/123206
PCT Pub. Date: Sep. 20, 2012

(65) Prior Publication Data
US 2015/0028179 A1    Jan. 29, 2015

(30) Foreign Application Priority Data

Mar. 11, 2011   (DE) .......................... 10 2011 013 685

(51) Int. Cl.
*F16M 1/02*     (2006.01)
*F16F 15/08*    (2006.01)
*F16M 13/02*    (2006.01)

(52) U.S. Cl.
CPC ................ *F16F 15/08* (2013.01); *F16M 13/02* (2013.01)

(58) Field of Classification Search
USPC ......................................... 248/605, 614, 603
See application file for complete search history.

(56) References Cited

U.S. PATENT DOCUMENTS

| | | | | |
|---|---|---|---|---|
| 1,738,532 A | * | 12/1929 | Harbour ......................... | 248/605 |
| 2,076,034 A | | 4/1937 | Lampman | |
| 2,332,264 A | * | 10/1943 | Saurer ........................... | 248/605 |
| 2,386,788 A | * | 10/1945 | Geldhof et al. ............... | 248/603 |
| 2,685,425 A | * | 8/1954 | Wallerstein, Jr. .............. | 248/621 |
| 2,953,336 A | * | 9/1960 | Etchells ........................ | 248/605 |
| 3,321,940 A | * | 5/1967 | Brucken ........................ | 68/23.3 |
| 3,548,964 A | * | 12/1970 | Ligniez et al. ................ | 248/605 |

(Continued)

FOREIGN PATENT DOCUMENTS

| | | |
|---|---|---|
| DE | 4405577 A1 | 8/1995 |
| DE | 201 09332 U1 | 8/2001 |
| DE | 20 2005 004 271 U1 | 7/2006 |
| EP | 1 303 710 B1 | 9/2004 |
| GB | 546 004 A | 6/1942 |
| GB | 553 793 A | 6/1943 |

(Continued)

OTHER PUBLICATIONS

International Search Report (in German with English translation) and Written Opinion (in German) for PCT/EP2012/052604, mailed Apr. 26, 2012; ISA/EP.

*Primary Examiner* — Bradley Duckworth
(74) *Attorney, Agent, or Firm* — Harness, Dickey & Pierce, P.L.C.

(57) ABSTRACT

The invention relates to a vibration damping receptacle device for receiving a motor (1) on a fan housing wall (2) having a motor support element (3) on which a plurality of attachments (4) are formed, a plurality of receptacles (6) disposed directly on the housing wall, and a plurality of elastic damping elements (5) disposed between the attachments and the receptacles such that the axial center axes thereof are each oriented at least in sections in the direction of the motor.

20 Claims, 3 Drawing Sheets

(56) References Cited

Figure 1:
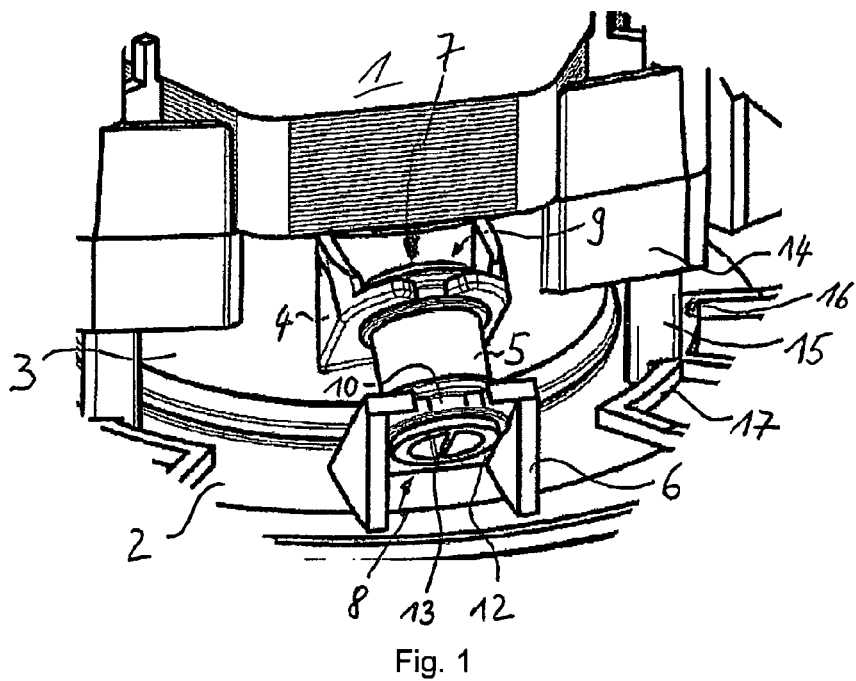

U.S. PATENT DOCUMENTS 8,794,607 B2 * 8/2014 Sobajima et al. .......... 267/141.1
2006/0226299 A1 10/2006 Tungl et al.

FOREIGN PATENT DOCUMENTS

| GB | 665 079 A | 1/1952 |
| WO | WO-03/042567 A2 | 5/2003 |

* cited by examiner

VIBRATION DAMPING RECEPTACLE DEVICE

CROSS-REFERENCE TO RELATED APPLICATIONS

This application is a 371 U.S. National Stage of International Application No. PCT/EP2012/052604 filed on Feb. 15, 2012 and claims priority to German Patent Application No. DE 10 2011 013 685.1, filed on Mar. 11, 2011, the contents of the above are herein incorporated by reference in their entirety.

The invention relates to a vibration damping receptacle device for receiving a motor on a housing wall, in particular a fan housing wall.

Vibration damping or vibration insulating receptacle devices are known from the prior art. DE 20 2005 004 271 U1, for example, discloses a vibration damping bearing of a motor on a base in which a resilient element is arranged, clipped in on both sides between a motor mounting and a base.

DE 201 09332 U1 discloses a hanger for supporting a machine on a housing wall in which a bolt-like fastening element arranged on the housing wall is guided through a damping or decoupling element arranged on the motor mounting in order to create a positive-fit connection.

DE 4405577 A1 further discloses an arrangement for vibration-damped mounting of an electric motor on a fan housing wall by way of a resilient damper element in which the damper elements are configured in the shape of discs and are penetrated by the bolted motor connection.

A method for damping vibrations and for mounting the associated device is disclosed, for example, in EP 1303710 B1.

Starting from the solutions disclosed in the prior art, the object of the invention is to provide an arrangement of the generic type which, on one hand, can be manufactured more cost-efficiently and can be assembled more quickly due to a reduced number of required components and, on the other hand, guarantees improved support with a consistently high level of damping.

The object is achieved by a vibration damping receptacle device for receiving a motor on a housing wall, having a motor mounting element on which a plurality of attachments are constructed, a plurality of receptacles arranged directly on the housing wall and a plurality of resilient damping elements which are arranged between the attachments and the receptacles in such a manner that their respective axial centrelines point at least in sections in the direction of the motor.

In an arrangement of an electric motor on a housing wall, the vibrations generated by the motor must be damped or decoupled largely in order to prevent them from being transferred to the fan housing. As the fans are installed with a vertical or horizontal shaft position as required, adequate support of the motor must also be ensured in addition to damping. The installation position of the fan must not affect the position of the fan wheel relative to the housing. In the known arrangements, however, improved support was always accompanied by worsened damping with the result that the support was frequently decoupled from the damping. In particular for the installation of fans with shaft positions between vertical and horizontal, additional supporting devices were provided for the laterally arranged electric motor in order to maintain the damping properties of the damping elements. Otherwise the relatively high weight of the motor would act against the damping elements and restrict their actual damping function.

The solution according to the invention provides that a load originating from the motor can be transferred to the resilient damping elements from all sides under tension and compression. The motor mounting element and the housing wall preferably each comprise three attachments and receptacles arranged in the peripheral direction, in each case at equal distances of 120 degrees and each in one plane, which are connected respectively to each other via a resilient damping element. The forces and vibrations originating from the motor due to its dead weight, particularly in an installation position with a horizontal shaft, and acting on the damping elements are introduced into the resilient damping elements via the attachments of the motor mounting element, wherein, with a resilient damping element, a tensile force brings about a compressive force in the other damping elements and vice versa. As a result of the respective axial centrelines of the resilient damping elements pointing at least in sections in the direction of the motor, it is possible for significantly higher forces to be absorbed and at the same time for improved support to be realised with consistent damping without the need for providing additional supporting devices, among other things, for the installation position with the fan shaft horizontal.

In a preferred embodiment, the respective axial centrelines of the resilient damping elements point at least in sections in the direction of the motor centre of gravity. In this manner, the forces originating from the motor are introduced centrally into the resilient damping elements, thus ensuring particularly good support and damping. The force-absorbing ability of the resilient damping elements is also ideally utilised. In a preferred embodiment, the axial centrelines of the resilient damping elements point at the same time, at least in a joining region, towards the attachments of the motor mounting element in the direction of the motor centre of gravity, such that the load is transferred via the attachments to the resilient damping elements pointing towards the motor centre of gravity.

In an advantageous embodiment, the motor mounting element itself is part of the motor and forms its bearing end plate. In this manner, it is possible, on one hand, to keep the installation height of the vibration damping receptacle device low and, on the other hand, to reduce the number of components absolutely necessary. The bearing end plate is preferably made of plastics material such that the attachments are distributed peripherally on the outside and are injection moulded on so as to point towards the receptacles of the fan housing wall. In addition, such a solution can also be implemented particularly cost-efficiently.

An embodiment in which the housing wall is continuous in the region of the receptacles, i.e. without drilled holes, openings, fixing holes or similar, and the receptacles are rather formed integrally on the housing wall is also preferable. Discontinuities of the housing wall, such as are provided, for example, in DE 201 09332 U1 for the attachment of a bolt, are a disadvantage as there is a risk of leaks due to such discontinuities. Forming the receptacles directly on the housing wall without having to provide such openings avoids this risk. For this purpose, the housing wall and the receptacles, for example, may be produced integrally as an injection moulded part. With such an embodiment, there is a guarantee that the resilient damping elements will resiliently connect the motor mounting element or the bearing end plate directly to the housing wall. The number of required components is thus further minimised.

For attaching the resilient damping elements to the receptacles of the housing wall and the attachments of the bearing end plate, it is provided in a favourable embodiment that the attachments and/or the receptacles have a central opening with a lateral insertion opening into which the resilient damping elements can be inserted. It is preferable that such a configuration is provided both on the attachments and also on the receptacles as this facilitates particularly easy, fast and automatable assembly of the damping elements. Compared to the clip-in method frequently used in the prior art, where parts of the relevant resilient element are pushed part-way through an opening until a corresponding engagement is achieved at a predetermined point, the damping elements according to the invention are easily and quickly inserted into the lateral insertion opening and subsequently fixed adjacent to the central opening.

In an advantageous embodiment, the attachments and/or the receptacles have hook sections pointing towards each other which form the lateral margins of the insertion opening. The hook sections are advantageously curved inwards on the outside towards the centre point of the central opening so that the resilient damping elements can be inserted smoothly in the direction of the central opening. On the side facing the central opening, the hook sections form an undercut which prevents the damping element from detaching unintentionally from the retention position in the central opening.

For installation purposes, the resilient damping elements are merely moved together laterally and pushed through the lateral insertion opening into the attachments or receptacles up to the relevant central opening. At this point, the resilient damping elements re-assume their original shape and are held in their respective position by the hook sections.

In an advantageous embodiment, the resilient damping elements have an external channel on at least one of their axial end regions, said channel being insertable into the insertion opening of the attachments and the receptacles in such a manner that the resilient damping elements are held in their axial direction and can absorb the tensile and compressive forces. Channels are preferably provided in each case both in the region of the attachments and also the receptacles. With the help of the relevant channel, the damping elements can be inserted, on one hand, into the attachments and receptacles at a predefined position, while on the other hand the forces and vibrations generated by the motor can be transferred via the axial marginal surfaces of the channel which are in contact with the axial marginal surfaces of the attachments and receptacles.

In a preferred embodiment, such a channel is formed at least in part by peripheral webs extending radially beyond an outer surface of the resilient damping elements. The axial contact surface between attachments and resilient element or receptacles and resilient element is enlarged due to the radially extending webs, such that the damping elements are attached on both sides and can transfer higher tensile and compressive forces compared to the embodiments of the prior art. Such channels are favourably formed by a peripheral groove on the outer surface of the damping elements and radially extending webs which are adjacent in each case.

To make optimum use of the space between motor and housing wall, it is provided in one embodiment that the resilient damping elements are angled and span an angle between 40 and 60 degrees, preferably 45 to 50 degrees, even more preferably 45 degrees. In such an embodiment, the receptacles may be arranged close to the bearing end plate and without undercut and thus may be manufactured easily from a tool point of view. This is particularly advantageous for manufacturing the fan housing wall by injection moulding. It is favourable if the receptacles extend perpendicular to the fan housing wall such that the resilient damping elements can be inserted into the lateral insertion opening vertically from above.

In a development of the embodiment with the angled damping elements, anti-torsion means are provided in each channel. This ensures that the damping elements remain in the desired position after installation and do not twist under tensile and compressive stresses or vibrations. In an advantageous embodiment, integrally formed protrusions, which are supported in the installed state in a positive-fitting manner on the undercuts of the hook sections, are provided as anti-torsion means.

It is also advantageous if the damping elements are tubular and have at least one axial rib which extends centrally through the damping element and increases its stability. Favourable reinforcing properties are achieved particularly if the axial web has a wall thickness which is less than or equal to the wall thickness of the outer wall of the damping element.

The resilient damping elements are preferably made of silicone in the silicone injection moulding process and have a hardness of 30 to 80 Shore-A, preferably 50 to 70 Shore-A. Harder damping elements may be used for relatively heavy electric motors, less hard damping elements for lighter electric motors.

In a development of the invention, an anti-torsion device is provided which limits the rotary movements of the motor mounting element in relation to the housing wall. In a preferred embodiment, a protrusion is configured for this purpose on the housing wall, said protrusion being overlapped by a section of the motor mounting element or the bearing end plate.

The invention renders it possible to reduce the receptacle device for support and damping to a few components, wherein forces originating from the motor are transferred to the damping elements which are arranged directly on the housing wall. In an embodiment of the motor mounting element as a bearing end plate, which is then a component part of the motor, only the housing wall, the damping element and the motor remain as the components used.

Figure 2:
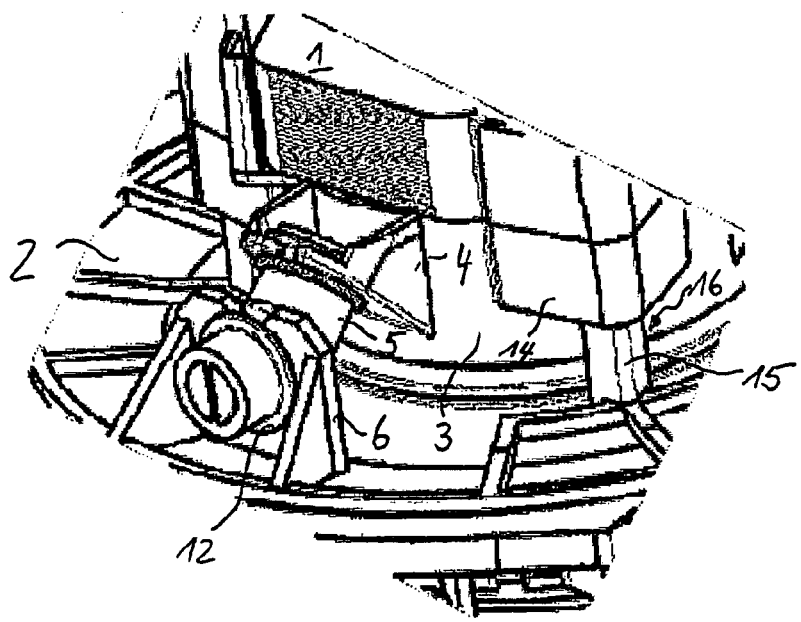
Figure 3:
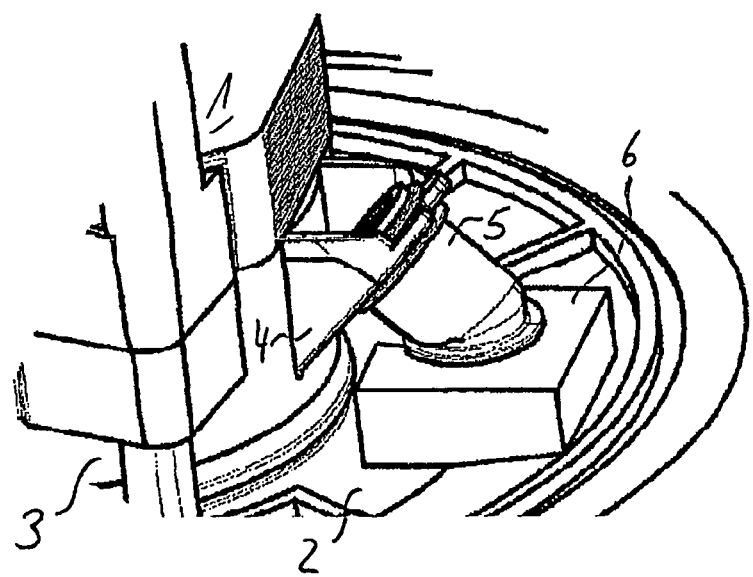
Figure 4:
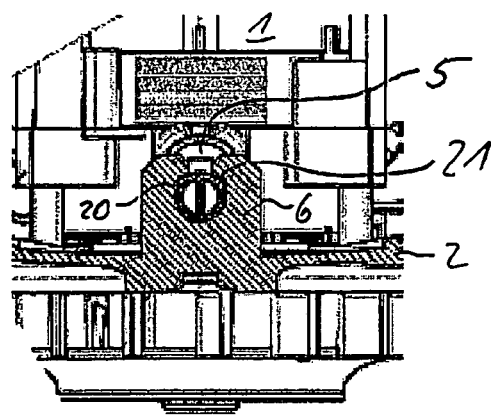
Figure 5:
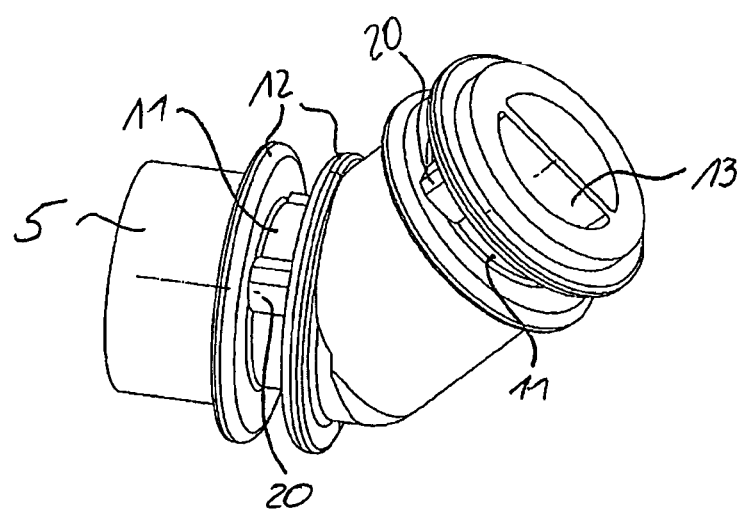

Preferred developments of the invention are defined in the dependent claims and will become apparent from the following description. Embodiments will be explained in greater detail based on the associated drawings without being restricted hereto. The schematic exemplary drawings show:

FIG. 1 a detail of a perspective representation of the receptacle device according to the invention;

FIG. 2 a detail of a perspective representation of a further embodiment of the receptacle device according to the invention;

FIG. 3 a detail of a perspective representation of a further embodiment of the receptacle device according to the invention;

FIG. 4 a partial sectional view of the embodiment according to FIG. 2;

FIG. 5 a perspective view of a damping element of FIGS. 2-4.

FIG. 1 shows a perspective detail of a vibration damping receptacle device for receiving a motor 1 on a fan housing wall 2 of a fan housing. A motor mounting element 3 designed as a bearing end plate of the motor 1 has attachments 4 each arranged at identical distances of 120 degrees over its peripheral direction, said attachments each being suitable for the attachment of one resilient damping element 5. Three receptacles 6 are formed integrally on the fan housing wall 2 in such a way that their vertical central plane is congruent with that of the attachments 4. The resilient damping element 5 is releasably fastened to both the attachments 4 and also to receptacles 6 and at the same time is arranged in such a manner that their respective axial central axes point in the direction of the motor 1, in the direction of the centre of gravity of the motor 1 in the embodiment shown. Both the bearing end plate 3 and also the fan housing wall 2 are made of plastics material, wherein the attachments 4 and the receptacles 6 are each formed integrally in the injection moulding process. Alternatively, aluminium which is processed in aluminium die casting can also be used as the material. The bearing end plate 3 and the fan housing wall 2 are directly joined to one another via the resilient damping elements 5. In this case, the fan housing wall 2 is configured as a continuous disc member, i.e. the fan housing wall 2 has no further opening other than the opening for the motor shaft in the central region. Both the attachments 4 and also the receptacles 6 each comprise a central opening 7, 8 in which the resilient damping elements 5 are arranged in a releasably fastened manner in the installed state. The central openings 7, 8 each have a lateral insertion opening 9, 10 into which the resilient damping elements 5 are inserted for installation. The insertion openings 9, 10 of the attachments 4 and the receptacles 6 are formed by hook sections pointing towards each other, wherein the hook sections each have an undercut which secures the resilient damping element 5 against unintentional detachment in the installed state. The opening width of the lateral insertion opening 9, 10 corresponds to double the wall thickness of the resilient damping elements 5. The lateral insertion openings 9 of the illustrated attachment 4 have external roundings so that the resilient damping element 5 can be inserted smoothly into the central opening 7. Without it being noticeable, such a configuration is provided on each of the attachments 4 and the receptacle 6.

On their axial end regions, the resilient damping elements 5 have channels 11 on the outside which are inserted into the relevant insertion openings 9, 10 of the attachments 4 and the receptacles 6 in such a manner that the hook sections encompass each channel 11 of the resilient damping element 5, such that the axial marginal planes of the hook sections are in engagement with the axial walls of the channels 11 and the resilient damping elements 5 are held in both axial directions both at the attachments 4 and also the receptacles 6. In the embodiment according to FIG. 1, the channels 11 are formed by a peripheral groove in the outer material of the damping element 5 and by peripheral webs 12 extending beyond its outer surface (see also FIG. 5). The webs 12 are arranged on both axial sides of the channels 11 and enlarge the axial retention surface between the attachments 4 and the receptacle 6 with the resilient damping element 5.

The damping element 5 is tubular to increase stability. Moreover, an axial rib 13 is provided which extends through the damping element 5 and which has a wall thickness less than or equal to the wall thickness of the damping element 5. In the embodiment illustrated, the thickness of the axial web is half the wall thickness of the damping element 5.

The vibration damping receptacle device according to the invention is used to absorb tensile and compressive forces which are generated by the motor 1 in the direction of the housing wall 2. To prevent additional rotational movements of the motor 1 in relation to the fan housing wall 2, an anti-torsion device 16 is provided in which a hollow body 14 formed integrally on the bearing end plate 3 overlaps a pin 15 formed integrally on the fan housing wall 2. Additionally provided in the embodiment shown are optional stiffening webs 17 which are integrally formed on the outside of the fan housing wall 2.

FIG. 2 illustrates a detail of an alternative embodiment of the vibration damping receptacle device, wherein features which are not otherwise described are identical to the embodiment according to FIG. 1. The resilient damping elements 5 are angled and span an angle of 45 degrees. For motors with a higher centre of gravity, i.e. a centre of gravity further away from the fan housing wall 2, the angle may be smaller, for motors with a lower centre of gravity the angle may be larger. The hook sections of the receptacles 6 extend perpendicular to the fan housing wall 2 and may therefore be manufactured particularly easily in the injection moulding process. The resilient damping elements 5 have means for anti-torsion in their channels 11, said means being realised in that protrusions 20 are provided on the radial outer surfaces of the channels 11, said protrusions being in contact with the undercuts of the hook sections of the attachments 4 or the receptacles 6 in the installed state.

FIG. 3 shows a further embodiment with all the features from FIG. 1, wherein the receptacle 6 is designed as a box arranged on the fan housing wall 2 into which the damping element 5 can be inserted laterally. The damping element 5 is angled, as shown in FIG. 2, but its arrangement is rotated by 180 degrees compared to the embodiment from FIG. 2.

FIG. 4 shows the embodiment from FIG. 2 in a lateral sectional view, wherein the cut edge runs through the receptacle 6. As an anti-torsion device, protrusions 20, which are in engagement with the undercuts 21 of the hook sections of the receptacles 6, are formed integrally in the channel 11 of the resilient damping element 5. As soon as the resilient damping element 5 is inserted into the central opening 8, said resilient damping element 5 can be rotated by means of the protrusions 20 into the predetermined position until the protrusions 20 are in contact with the protrusions 21. Further rotation is prevented both during installation and also in operation. A corresponding configuration of the damping elements 5 is also provided in the channels of the attachments 4.

FIG. 5 illustrates a damping element 5 of FIGS. 2 to 4 in a perspective view with a spanned angle of 45 degrees. The embodiment in FIG. 1 differs merely due to the straight configuration. The channels 11 which are arranged on both sides in each axial end region are formed by a peripheral groove, on the axial outer edges of which the webs 12 additionally extend radially. The protrusions 20 are formed integrally inside the channels 11 and prevent twisting of the damping element 5 arranged in the respective central opening of the receptacles or attachments. It is possible to dispense with the protrusions in the case of a straight configuration according to FIG. 1. The axial web 13 is arranged centrally, extends centrally through the entire resilient damping element 5 and runs vertically in the installed state as shown in FIG. 2.

The invention is not restricted to the preferred embodiments specified above. Rather a number of variants are conceivable which make use of the solution illustrated even in embodiments of a fundamentally different type. For example, in addition to the axial web running through the resilient damping element, one axial web running horizontally or three axial webs in a star shape at an angle of 60 DEGREES to each other may be provided additionally or alternatively. Moreover, in addition to the protrusions illustrated singly for engagement with the undercuts of the hook sections, further protrusions may be provided which engage as a type of latch in corresponding recesses of the attachments or receptacles.

The invention claimed is:

1. A vibration damping receptacle device in combination with a motor mounted on a fan housing the combination comprising:
   a motor mounting element on which a plurality of attachments are constructed,
   a plurality of receptacles arranged directly on a fan housing wall of the fan housing, and a plurality of resilient damping elements, each of which are arranged between a respective attachment and a respective receptacle in such a manner that an axial centerline of the resilient damping element points in a direction of the motor; wherein each of the plurality of attachments and each of the plurality of receptacles have a central opening within which a resilient portion of a respective resilient damping element is releasably fastened; and each of the damping elements are angled such that the respective axial centerlines of each of the resilient damping elements point in a direction of the motor centre of gravity.

2. The combination according to claim 1, wherein the respective axial centerlines of the resilient damping elements each point at least to the attachments of the motor mounting element in the direction of the motor center of gravity.

3. The combination according to claim 1, wherein the motor mounting element forms a bearing end plate of the motor.

4. The combination according to claim 1, wherein the fan housing wall is continuous and the receptacles are formed integrally on the fan housing wall.

5. The combination according to claim 1, wherein the resilient damping elements of the motor mounting element join to the fan housing wall.

6. The combination according to claim 1, wherein each of the central openings include a lateral insertion opening into which the resilient damping elements are insertable.

7. The combination according to claim 6, wherein the attachments and/or the receptacles have hook sections pointing towards each other which form the lateral insertion opening.

8. The combination according to claim 6, wherein the resilient damping elements have an external channel on at least one of their axial end regions, said channel being insertable in the lateral insertion opening of the attachments and/or of the receptacles in such a manner that the resilient damping elements are held in their axial direction.

9. The combination according to claim 8, wherein the external channel is formed at least in part by peripheral webs extending radially beyond an outer surface of the resilient damping elements.

10. The combination according to claim 8, wherein an anti-torsion device is provided in the external channel.

11. The combination according to claim 1, wherein each of the resilient damping elements is tubular and has at least one axial web disposed within a tubular opening defined by the tubular resilient damping element, the at least one axial web extending entirely across a radial direction of the tubular opening.

12. The combination according to claim 11, wherein the at least one axial web is disposed entirely within the tubular opening.

13. The combination according to claim 1, wherein the resilient damping elements are angled to define two sections which span an angle between 40 and 60 degrees, an axial centerline of one of the two sections points in the direction of the motor center of gravity.

14. The combination according to claim 1, wherein the resilient damping elements have a hardness of 30-80 Shore A.

15. The combination according to claim 1, further comprising an anti-torsion device which limits the rotary movements of the motor mounting element in relation to the housing wall.

16. The combination according to claim 1, wherein each of the plurality of resilient damping elements is made of an elastomeric material, the elastomeric material extending continuously from the respective attachment to the respective receptacle.

17. The combination according to claim 16, wherein the elastomeric material is silicone.

18. The combination according to claim 1, wherein each of the plurality of resilient damping elements is a single piece component.

19. The combination according to claim 18, wherein each of the plurality of resilient damping elements is made of silicone.

20. The combination according to claim 1, wherein an outer surface of each of the plurality of resilient damping elements directly contact a respective attachment and directly contact a respective receptacle.

* * * * *